(12) United States Patent
Song et al.

(10) Patent No.: US 7,659,354 B2
(45) Date of Patent: *Feb. 9, 2010

(54) HYDROPHOBICALLY MODIFIED POLYMERS AS LAUNDRY ADDITIVES

(75) Inventors: Zhiqiang Song, Newtown, CT (US); Jianwen Mao, New Milford, CT (US); Hauke Rohwer, Lörrach (DE); Ullrich Menge, Grenzach-Wyhlen (DE)

(73) Assignee: Ciba Specialty Chemiclas Corporation, Tarrytown, NY (US)

( * ) Notice: Subject to any disclaimer, the term of this patent is extended or adjusted under 35 U.S.C. 154(b) by 467 days.

This patent is subject to a terminal disclaimer.

(21) Appl. No.: 10/540,198

(22) PCT Filed: Dec. 15, 2003

(86) PCT No.: PCT/EP03/51000

§ 371 (c)(1),
(2), (4) Date: Aug. 8, 2006

(87) PCT Pub. No.: WO2004/056888

PCT Pub. Date: Jul. 8, 2004

(65) Prior Publication Data

US 2006/0287216 A1 Dec. 21, 2006

Related U.S. Application Data

(60) Provisional application No. 60/509,032, filed on Oct. 6, 2003, provisional application No. 60/436,040, filed on Dec. 23, 2002.

(51) Int. Cl.
| | |
|---|---|
| C08F 226/04 | (2006.01) |
| C08F 220/14 | (2006.01) |
| C08F 220/30 | (2006.01) |
| C08F 220/18 | (2006.01) |
| D06P 5/08 | (2006.01) |
| C11D 3/37 | (2006.01) |

(52) U.S. Cl. .............. 526/307; 525/328.3; 8/137; 510/361; 510/475; 510/477; 510/499

(58) Field of Classification Search ........... 510/361, 510/475, 477, 499; 8/137; 525/328.3; 526/307
See application file for complete search history.

(56) References Cited

U.S. PATENT DOCUMENTS

| | | | | |
|---|---|---|---|---|
| 2,923,701 A | 2/1960 | Schuller et al. | ............ | 260/85.5 |
| 3,673,110 A | 6/1972 | Edwards | ............ | 252/427 |
| 3,694,364 A | 9/1972 | Edwards | ............ | 252/90 |
| 3,749,682 A | 7/1973 | Tanner | ............ | 252/524 |
| 3,816,321 A | 6/1974 | Kleinschmidt | ............ | 252/134 |
| 4,299,898 A | 11/1981 | Williams et al. | ............ | 430/106 |
| 4,305,860 A | 12/1981 | Iovine et al. | ............ | 260/29.6 |
| 4,380,453 A | 4/1983 | Claiborne | ............ | 8/606 |
| 4,753,999 A * | 6/1988 | Keil et al. | ............ | 525/328.3 |
| 5,149,456 A | 9/1992 | Concannon et al. | ............ | 252/174.25 |
| 5,380,447 A | 1/1995 | Kirk et al. | ............ | 252/8.6 |
| 5,413,731 A | 5/1995 | Adler et al. | ............ | 252/174.24 |
| 5,466,802 A | 11/1995 | Panandiker et al. | ............ | 544/193.2 |
| 5,653,772 A | 8/1997 | Mori et al. | ............ | 8/495 |
| 5,698,476 A | 12/1997 | Johnson et al. | ............ | 442/121 |
| 5,744,435 A | 4/1998 | Hartman et al. | ............ | 510/101 |
| 5,830,844 A | 11/1998 | Detering et al. | ............ | 510/475 |
| 5,863,879 A | 1/1999 | Zirnstein et al. | ............ | 510/360 |
| 6,103,831 A | 8/2000 | Shih et al. | ............ | 525/359.3 |
| 6,121,223 A | 9/2000 | Dixon et al. | ............ | 510/360 |
| 6,156,829 A | 12/2000 | Shih et al. | ............ | 524/99 |
| 6,165,969 A | 12/2000 | Böckh et al. | ............ | 510/475 |
| 6,191,098 B1 | 2/2001 | Rodrigues et al. | ............ | 510/475 |
| 6,271,386 B1 | 8/2001 | Shih et al. | ............ | 546/347 |
| 6,306,815 B1 | 10/2001 | Rodrigues et al. | ............ | 510/475 |
| 6,326,343 B1 | 12/2001 | Ghatlia et al. | ............ | 510/222 |
| 6,348,441 B1 | 2/2002 | Aiken, III et al. | ............ | 510/304 |
| 6,949,498 B2 | 9/2005 | Murphy et al. | ............ | 510/327 |
| 2002/0045558 A1 | 4/2002 | Creeth et al. | ............ | 510/290 |
| 2003/0017963 A1 | 1/2003 | Creeth et al. | ............ | 510/499 |

FOREIGN PATENT DOCUMENTS

| | | |
|---|---|---|
| DE | 296307 | 11/1991 |
| EP | 0232519 | 8/1987 |
| EP | 0685591 | 12/1995 |
| EP | 0995791 | 4/2000 |
| GB | 1372787 | 11/1974 |
| WO | 97/42285 | 11/1997 |
| WO | 98/23714 | 6/1998 |
| WO | 01/79407 | 10/2001 |
| WO | 02/20709 | 3/2002 |

* cited by examiner

*Primary Examiner*—Brian P Mruk
(74) *Attorney, Agent, or Firm*—Joseph Suhadolnik; Kevin T Mansfield

(57) ABSTRACT

The present invention is directed to polymeric compounds comprising a main backbone derived from at least the following monomeric components: (I) 20 to 99.9% by weight, preferably 50% to 99% by weight, of at least one cationic monomer according to formula (I), and (II) 0.1 to 80% by weight of a hydrophobic unsaturated nonionic monomer that polymerizes in the presence of an initiator, optionally a water-soluble monomer (III) different from either monomer (I) and monomer (II), and optionally a crosslinking agent (IV). Said compounds are particularly useful to overcome the problem of dye bleeding and/or dye transfer in laundry processes.

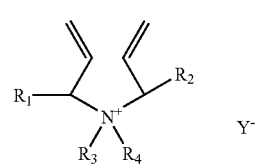

(1)

16 Claims, No Drawings

HYDROPHOBICALLY MODIFIED POLYMERS AS LAUNDRY ADDITIVES

This application is a 371 filing of EP 03/51000 which claims benefit under 35 USC 119(e) of U.S. provisional application No. 60/509,032 filed Oct. 6, 2003 and 60/436,040, filed Dec. 23, 2002, the disclosures of which are incorporated herein in their entirety by reference.

BACKGROUND

Various attempts have been made to overcome the problem of dye bleeding and/or dye transfer in laundry processes. The term "dye bleeding" often refers to the fact that certain dyes will come off the fabrics during laundering, thereby causing color fading of the fabrics. Such a phenomenon seems to be more prominent for cellulosic fabrics dyed with non-reactive dyes such as direct, vat, azoic and sulfur dyes (D R. Warring and G. Hallas, "The chemistry and application of dyes", Plenum Press, New York, 1990). Dyes that come off the fabrics are often called "migrating dyes" and the process to overcome dye bleeding are often referred to as "dye fixation".

On the other hand, there is also a need to take care of the migrating dyes that have already come off the fabrics and are present in the wash liquor. Otherwise, such migrating dyes might redeposit on fabric surfaces and thereby cause color contamination. This process is often referred to as "dye transfer inhibition" and/or "stain inhibition".

Hence there is a need for additives that can be added into laundry detergents and/or after rinse products to help either prevent dyes on fabrics from bleeding, i.e. fixing, or substances that can prevent migrating dyes from re-deposition. Indeed much efforts have been made to overcome such problems, and substances that could help tackle such problems are often referred as dye fixatives, dye transfer inhibitors, anti-deposition agents, dye scavengers and/or staining inhibitors.

For example, U.S. Pat. No. 3,694,364, there is disclosed the use of tertiary polymeric amines which function as anionic dye scavengers. The polymeric amines are chemically affixed on the surface of a substrate material such as cellulosic materials, for example, cotton in any of its forms, purified cotton cellulose, cellulose sponge and the like. To affix the polymeric amines, the cotton substrate is modified by phosphorylation and chemisorption of the polymeric amine. In related U.S. Pat. No. 3,673,110, there is disclosed the use of both the tertiary polymeric amines and quaternary ammonium compounds as the dye scavenging material. The latter Edwards patent discloses other processes for chemically affixing the dye scavenger compounds to a cellulosic material substrate also for use in controlling undesirable random dyes in a liquid bath such as when laundering textile articles. For example, the hydroxylated surface of the cellulosic material is chemically modified to establish anionic functional groups. Each of the anionic functional groups is capable of chemically binding nitrogen compounds such as the aforementioned disclosed dye scavenger compounds.

In addition to modifying the fabric surface to present dye transfer, it is also possible to add into the laundry sacrificial materials that absorb migrating dyes, thereby prevent the re-deposition on fabrics of value and concern. Such materials are often made in the form of fabrics treated with various chemicals that are believed to be capable to attracting dyes from the wash liquor. In Kleinschmidt, U.S. Pat. No.3,816, 321 there is disclosed a dye scavenging article for scavenging anionic dyes released from dyed fabrics being laundered to prevent dye transfer during the laundry process. The dye-scavenging article includes a support matrix such as a polyurethane material to which there is chemically bonded a dye-scavenging compound. The dye-scavenging compound includes polyquartenary ammonium compounds.

U.S. Pat. No. 4,380,453 discloses generally the use of N-trisubstituted ammonium-2-hydroxy-3-halopropyl compounds and salts of epoxy propyl ammonium as dye scavenger compounds. The preferred dye scavenger compound is glycidyltrimethylammonium chloride, which is applied to, adsorbed by, or impregnated in the cellulosic material substrate. The resulting cellulosic material substrate is disclosed as being suitable for use in conventional washing machines for laundering clothes to eliminate random dyes from the wash and rinse waters, thereby eliminating undesirable discoloration of clothes due to the transfer of dyes from other clothes in the washing machine.

U.S. Pat. No. 5,698,476 discloses an article for removing extraneous, random free-flowing dyes from laundry washing applications. The laundry article includes two components, a dye absorber and a dye transfer inhibitor, which are introduced into the wash water via a support matrix. The dye absorber is chemically attached to the support matrix to maintain a relational association during the laundry washing application. On the other hand, the dye transfer inhibitor is released from the support matrix into the wash water to be evenly distributed during the laundry washing application.

U.S. Pat. No. 5,698,476 discloses materials that are suitable as dye absorbers for the laundry article, including quaternary N-substituted ammonium)-hydroxy-haloalkyl compounds such as 2-hydroxy-3-chloropropoyltrimethylammonium chloride; polyquaternary ammonium compounds; polyamphoterics; quaternized starches; proteins; chitin or its hydrolyzed form, chitosan; choline chloride; polyvinyl amine (PVAm); polyethylene imine (PEI); as well as combinations thereof. Dye transfer inhibitors include polyvinyl pyrrolidone, polyvinyl alcohol, polyvinyl Imidazole, polyamine-N-oxides, cationic starches, magnesium aluminate, hydrotalcite, proteins, hydrolyzed proteins, polyethylene imines, polyvinyl oxazolidone, enzymes, oxidants, cationic surfactants, amphoteric surfactants, propylene oxide reaction products, polyamino acids, block co-polymers of alkylene oxides, polyamines, polyamides, methyl cellulose, carboxyalkyl, celluloses, guar gum, natural gums, alginic acid, polycarboxylic acids, cydodextrins and mixtures.

Another approach for tackling the problem of undesirable dye transfer is through the use of an oxidation catalyst that is capable of removing migrating dyes in the wash liquor, thereby preventing re-deposition. Such catalysts, e.g. selected manganese complexes, can be added into laundry detergents as special additives.

Certain polymers have also been found to be useful in preventing migrating dyes from re-deposition. For examples, the use of poly(vinyl pyridine) and its various derivatives and co-polymers in preventing dye re-depositions can be found in the following references.

U.S. Pat. No. 6,348,441 discloses a method for laundering soiled fabrics using a non-aqueous detergent formulated to control dye transfer and sudsing in high efficiency washing machine. U.S. Pat. No. 5,466,802 discloses the use of quaternary polyvinylpyridinium derivatives as anti-dye transfer agent. U.S. Pat. No. 6,306,815 discloses the use of quaternary polyvinylpyrridinium derivatives as anti-dye transfer agents. U.S. Pat. No. 5,380,447 discloses a process and fabric finishing compositions for preventing the deposition of dye in fabric finishing processes. U.S. Pat. No. 6,191,098 discloses polyvinylpyridinium derivatives as anti-dye transfer agents. U.S. Pat. No. 6,156,829 discloses a product and process for making quaternized, water-soluble vinylpyridine carboxylate polymers. U.S. Pat. No. 6,271,386 discloses a product and process for making quaternized, water-soluble vinylpyridine carboxylate polymers. U.S. Pat. No. 6,103,831 discloses water-soluble dye complexing polymers. U.S. Pat. No. 5,863,879 discloses dye transfer inhibitors for detergents (BASF, vinylamine derivatives). U.S. Pat. No. 6,165,969 discloses the use of quaternized polymerizates containing units of vinyl imidazole as a color fixing and color transfer inhibiting additive to detergent post-treatment agents and detergents. U.S. Pat. No. 5,830,844 discloses dye transfer inhibitors for detergents: Water-insoluble particles, crosslinked polymers containing polymerized units of 1-vinylpyrrolidone and/or 1-vinylimidazoles).

Various derivatives based on vinylpyridinum, poly(vinylpyridine-N-oxide) have been found to be efficient dye transfer inhibitors. The preparation and application of such compounds have been documented in U.S. Pat. No. 6,121,223 and U.S. Pat. No. 5,149,456.

Amine based products are believed to be able to provide dye transfer inhibition properties. For example, the use of N,N,N',N'-tetrakis-(2-hydroxypropyl) ethylenediamine) as dye transfer inhibitors is explored in U.S. Pat. No. 5,827,813. Other references relating to the use of amine based substances as dye transfer inhibitors include U.S. Pat. No. 6,251,846, U.S. Pat. No. 6,156,722 and U.S. Pat. No. 6,140,292.

In addition to the aforementioned references, the use of polyglycosides (U.S. Pat. No. 6,159,921) and various enzymes exhibiting peroxidase activities (U.S. Pat. No. 5,855,621) as dye transfer inhibitors is referred.

In comparison to the seemingly plentiful references on various substances and their utilities as laundry detergents to provide dye transfer inhibition properties, there appears to be very few references on substances that could help prevent bleeding of dyes from fabrics. Among the very few citations, the use of bis-(hydroxyphenyl)sulfone with formaldehyde as dye bleeding prevention agent is reported in U.S. Pat. No. 5,707,949.

The use of nitrogen-containing polymers is known for use in laundry applications, particularly for soil-release properties. Published PCT application WO-A-98/23714 discloses water-soluble use of nitrogen-containing soil-release polymers in detergent products. Some of these polymers are formed from acrylamide monomers and are polymerized with co-monomers that are amines of alkylacrylates. A nitrogen-containing soil release polymer is described in WO-A-98/23714 and is formed from dicarboxylic add monomers and hydrophilic co-monomers that are secondary amines, which contain (poly)alkyleneoxy groups. Published PCT application WO-A-98/23714 discloses polymers formed from alkyleneacrylate monomers having a terminal quaternary ammonium group and co-monomers, which are (meth)acrylic add or esters or salts thereof. The only example is a polymer formed from a cationic monomer, namely methacrylamidopropyl trimethylammonium chloride (MAPTAC), and anionic monomer, namely acrylic acid (AA) and a neutral monomer, namely isobutylacrylate (IsoBuA).

U.S. Pat. No. 3,749,682 discloses copolymers of polyvinylpyrrolidone (PVP) and vinyl acetate for use as soil anti-redeposition agents.

Published PCT application WO-97/42285 discloses cotton soil-release polymers comprising a polyamine backbone and quaternary ammonium cationic groups.

Published European patent application 995,791 discloses a broad range of hydrophobically modified polycarboxylate polymers that are said to be useful for promoting soil release from fabrics, particularly cotton and cotton-containing fabrics. The polymers can comprise up to three moieties A, B and C wherein A is a polymerized residue of a monomer selected from one or more $C_3$-$C_8$ monoethylenically unsaturated carboxylic acids, B is a polymerized residue of a monomer selected from one or more $C_3$-$C_{60}$ alkyl (meth)acrylates, ethoxylated $C_1$-$C_{24}$ alkyl (meth)acrylates, and poly(alkylene glycol) (meth)acrylates, alkyl or aromatic ethers of poly (alkylene glycol) and the corresponding maleate mono and di-esters thereof, and C is a polymerized residue of a monomer selected from one or more ethylenically unsaturated monomers which are copolymerizable with the monomers in A and B.

According to published British patent application 2,104,091, copolymers of anionic and cationlc vinyl monomers can be used as detergency builders, for a wide range of detergent products, e.g. for ware washing, hard surface cleaning, textile cleaning and hair products.

U.S. Pat. No. 5,783,533 discloses various amphoteric copolymers as rheological modifiers of lamellar phases of detergent or cosmetic compositions.

JP-A-59135293 discloses detergent compositions, which contain an amphoteric copolymer consisting of at least 10 mol % cationic vinyl monomer units, at least 10 mol % anionic vinyl monomer units and at least 10 mol % nonionic vinyl monomer units. The preferred proportion of cationic vinyl monomer units to anionic vinyl monomer units is a molar ratio from 1:2 to 2:1.

U.S. Pat. No. 5,413,731 disposes water-soluble terpolymers, which are useful in automatic machine dishwashing detergent formulations. These terpolymers contain as polymerized units (a) from about 92 to about 30% by weight of one or more $C_3$-$C_6$ monoethylenically unsaturated carboxylic acids, (b) from about 5 to about 50% by weight of one or more aminoacryloyl derivatives, and (c) from about 25% by weight of one or more monoethylenically unsaturated monomers polymerizable with (a) and (b).

OBJECT OF THE INVENTION

One objective is to provide hydrophobically modified polymers that contain cationic groups, particularly DADMAC moieties and method(s) for the preparation thereof. Another objective is to provide methods of use of such polymers as laundry additives that inhibit the transfer of dyes or fix dyes on fabric surfaces to prevent bleeding. Polymers having both hydrophobic and cationic groups are believed to be able to enhance the substantivity of the polymer to the substrates thereby improving the efficiency of dye fixation where it is most needed. At the same time these polymers possess reasonable water solubility/dispersibility that can facilitate the complexing of the polymers with dyes already lost to the wash liquor (migrating dyes) thus preventing transfer of the dyes to other fabrics in the same laundry.

Another objective is to provide methods of applications of such polymers in formulations that are used to treat surfaces at home or otherwise indoor environment to prevent staining. Examples of such surfaces include dishes in dishwashing applications, carpets, wood, laminate or other types of floors made of organic and inorganic materials.

Yet another objective of the invention is to provide formulations of various laundry care products containing the polymers having both cationic and hydrophobic groups as additives. Such products include but not limited to laundry detergents, after rinse conditioners, pretreatment agents, tumble drier sheet, after-washing sprays etc. It is conceivable that such products could be in the form of liquid, granules, tablets, or any combinations thereof. The preparation of such formulations can be carried out using various processes, machineries known to those who are skilled in the art. It would also be obvious to those who are skilled in the art that such products could be packaged in various forms with various packaging materials.

Another objective of the invention is to provide means of preparing various forms of laundry care products as aforementioned, but the performance of such products could be further enhanced by incorporation of other additives such as softeners, perfumes, soil release polymers, colorants, preservatives, antimicrobials with various activities against various microorganisms, insect repellents, dust mites repellents and/or otherwise controlling agents, optical brighteners, UV absorbers, other light management agents, ionization agents, antifoam agents, enzymes of various kind, bleaching agents, oxidation catalysts, zeolites, odor suppressing agents including but not limited to cyclodextrin and its various derivatives. It is obvious to those who are skilled in the art that other additives and/or agents can also be incorporated into laundry care products of any forms. An excellent description of typical laundry detergents and other laundry care products can be found in, though not limited to, U.S. Pat. No. 5,744,435, the content of which is incorporated herein by reference.

SUMMARY OF THE INVENTION

The present invention is directed to polymeric compounds comprising a main backbone derived from at least the following monomeric components: (I) 20 to 99.9% by weight, preferably 50% to 99% by weight, of at least one cationic monomer according to formula (1)

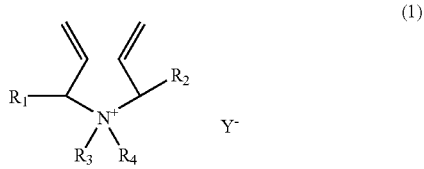

and (II) 0.1 to 80% by weight of a hydrophobic unsaturated nonionic monomer that polymerizes in the presence of an initiator; optionally up to 60% by weight of a water-soluble monomer (III) different from either monomer (I) and monomer (II); and optionally (IV), a crosslinking agent, in an amount between 0 to 10% by weight.

The subject matter, polymers having both hydrophobic and cationic groups, described herein are believed to have utilities in addition to laundry care. Examples could include retention and fixation agents for paper, wet fastness improvement before, during and/or after dyeing of fabrics, especially those made of cellulosic fibers, personal care and cosmetic products such as shampoos, conditioners, hair colorants, hair styling products, skin cleansing products, skin care products such as creams, lotions and toners. Application of the subject materials and various formulations containing such materials will be disclosed in a separate patent filing.

The subject matter, polymers having both hydrophobic and cationic groups, described herein are also believed to be capable of providing additional effects when used in laundry care applications. Possible benefits may include, but are not limited to, Improved hand, e.g. softening, and reduction of friction between the surfaces of the fabrics. The latter properties are believed to be capable of leading to consumer-appreciable claims such as, though not limited to, improved fabric appearance, wear reduction etc.

DETAILED DESCRIPTION OF THE INVENTION

The polymer having both hydrophobic and cationic groups is produced, in the presence of an activator, from a polymerization mixture comprising
(I) 20 to 99.9% by weight, preferably 50% to 99% by weight, of at least one cationic monomer according to formula (1)

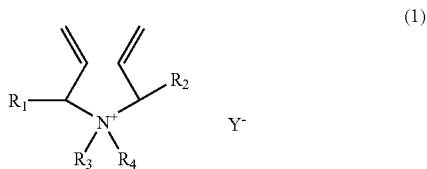

where
$R_1$ and $R_2$ are, independently of one another, hydrogen or $C_1$-$C_4$ alkyl;
$R_3$ and $R_4$ are, independently of one another, hydrogen, or an alkyl, hydroxyalkyl, carboxyalkyl, carboxyamidealkyl or alkoxyalkyl group having from 1 to 18 carbon atoms; and
$Y^-$ represents an anion; and (II) 0.1 to 80% by weight of a hydrophobic unsaturated nonionic monomer that polymerizes in the presence of an initiator The hydrophobic monomeric monomer (II) has a value for water solubility, preferably, of less than about 50 g/100 g water, and more preferably, less than 5 g/100 g water at room temperature and at a pH of 7.

Examples of the preferred cationic monomers (I) include diallyldimethyl ammonium chloride (DADMAC), diallyldimethyl ammonium bromide, diallyidimethyl ammonium sulfate, diallyldimethyl ammonium phosphates, dimethallyldimethyl ammonium chloride, diethylallyl dimethyl ammonium chloride, diallyl di(beta-hydroxyethyl) ammonium chloride, and diallyl di(beta-ethoxyethyl) ammonium chloride. The most preferred cationic monomer is DADMAC.

Examples of hydrophobic monomer (II) include, without limitation, selected vinyl and (meth)acrylate based compounds, and other unsaturated compounds such as (meth) acrylonitrile and esters of unsaturated polyfunctional acids.

Examples of suitable vinyl compounds for monomer (II) include, but are not limited to, styrene; vinyl esters of a $C_2$ to $C_{18}$ carboxylic acid, such as vinyl acetate and vinyl butyrate; N-vinyl amides of a $C_2$ to $C_{18}$ carboxylic acid such as N-vinyl acetamide, and the like.

The (meth)acrylate based compounds suitable as monomer (II) include, but are not limited to, esters of (meth)acrylic acid, and amides of (meth)acrylic acid.

Esters of (meth)acrylic acid or (meth)acrylates encompass: long- and short-chain alkyl (meth)acrylates such as methyl (meth)acrylate, ethyl (meth)acrylate, propyl (meth)acrylate, isopropyl (meth)acrylate, butyl (meth)acrylate, amyl (meth)acrylate, isobutyl (meth)acrylate, t-butyl (meth) acrylate, pentyl (meth)acrylate, isoamyl (meth)acrylate, hexyl (meth)acrylate, heptyl (meth)acrylate, octyl (meth) acrylate, isooctyl (meth)acrylate, 2-ethylhexyl (meth)

acrylate, nonyl (meth)acrylate, decyl (meth)acrylate, isodecyl (meth)acrylate, undecyl (meth)acrylate, dodecyl (meth)acrylate, lauryl (meth)acryiate, octadecyl (meth)acrylate, and stearyl (meth)acrylate;

alkoxyalkyl (meth)acrylates, particularly $C_1$-$C_4$alkoxy $C_1$-$C_4$alkyl (meth)acrylates, such as butoxyethyl acrylate and ethoxyethoxyethyl acrylate;

aryloxyalkyl (meth)acrylate, particularly aryloxy $C_1$-$C_4$alkyl (meth)acrylates, such as phenoxyethyl acrylate (e.g., Ageflex, Ciba Specialty Chemicals) single and multi-ring cyclic aromatic or non-aromatic acrylates such as cydohexyl acrylate, benzyl acrylate, dicyclopentadiene acrylate, dicyclopentanyl acrylate, tricyclodecanyl acrylate, bornyl acrylate, isobornyl acrylate (e.g., Ageflex IBOA, Ciba Specialty Chemicals), tetrahydrofurfuryl acrylate (e.g., SR285, Sartomer Company, Inc.), caprolactone acrylate (e.g., SR495, Sartomer Company, Inc.), and acryloylmorpholine;

alcohol-based (meth)acrylates such as polyethylene glycol monoacrylate, polypropylene glycol monoacrylate, methoxyethylene glycol acrylate, methoxypolypropylene glycol acrylate, methoxypolyethylene glycol acrylate, ethoxydiethylene glycol acrylate, and various alkoxylated alkylphenol acrylates such as ethoxylated(4) nonylphenol acrylate (e.g., Photomer 4003, Henkel Corp.);

amides of (meth)acrylic acid such as diacetone acrylamide, isobutoxymethyl acrylamide, and t-octyl acrylamide; and esters of polyfunctional unsaturated adds, such as maleic add ester and fumaric acid ester.

With respect to the long and short chain alkyl acrylates listed above, a short chain alkyl acrylate is an alkyl group with 6 or less carbons and a long chain alkyl acrylate is alkyl group with 7 or more carbons. Most suitable monomers are either commercially available or readily synthesized using reaction schemes known in the art. For example, most of the above-listed monomers can be synthesized by reacting an appropriate alcohol or amide with an acrylic acid or acryloyl chloride.

Specific examples of preferred compounds for use as monomer (II) are exemplified by:

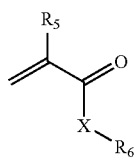

wherein $R_5$ is H or $CH_3$, $R_6$ is $C_1$-$C_{12}$alkyl, $C_1$-$C_{12}$alkoxy, $C_1$-$C_6$alkylphenyl that may be substituted one to three times by $C_1$-$C_{12}$alkyl or $C_1$-$C_{12}$alkoxy, or $C_1$-$C_6$alkylphenyl interrupted one or more times by oxygen wherein the phenyl group may be substituted one to three times by $C_1$-$C_{12}$alkyl or $C_1$-$C_{12}$alkoxy or $C_1$-$C_6$alkylhydroxy;

and X is a divalent radical of —O—, —NH— or —$NR_7$, wherein $R_7$ is $C_1$-$C_6$alkyl.

Preferred compounds are of the formulae:

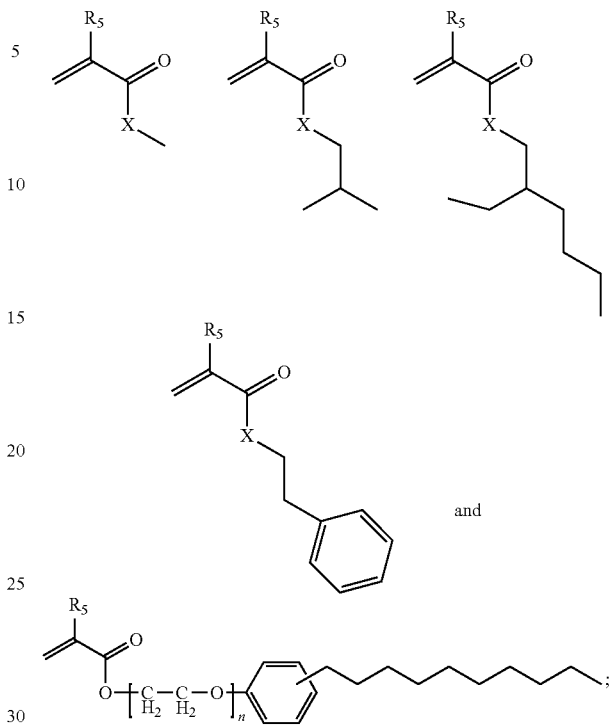

wherein $R_5$ and X are defined above and n is a number from 1 to 5, preferably 2 or 3.

Particularly preferred compounds are of the formulae:

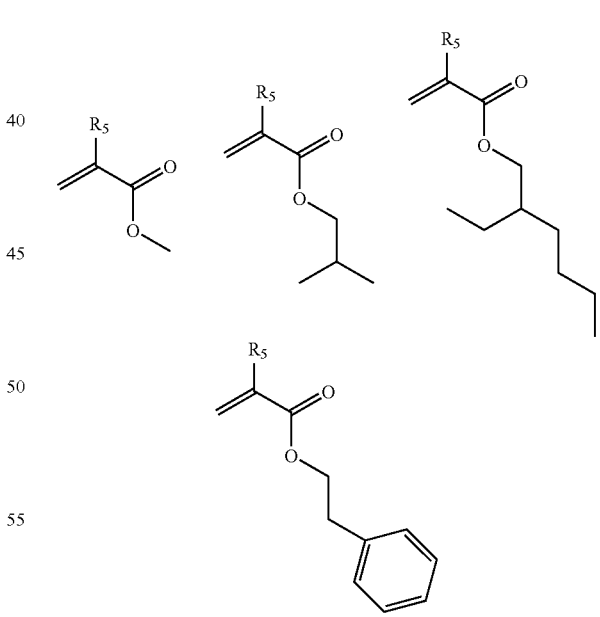

wherein $R_5$ is H or $CH_3$.

The polymerization mixture optionally further includes a water-soluble monomer (III) that is a polymerizable monomer different from monomer (I) and monomer (II). Water-soluble monomer (III) has a value for water solubility preferably greater than 50 g/100 g water at room temperature and at a pH of 7.

Water-soluble monomer (III) can be nonionic, anionic or cationic. Examples of monomer (III) include vinyl amine, vinyl formamide, vinyl alcohol, vinylpyrrolidone, vinyl caprolactam, vinyl derivatives of dimethyl siloxane, aminosiloxanes and other derivatives, various vinyl fluorocarbons, hydroxyalkyl acrylates such as 2-hydroxyethyl-acrylate, 2-hydroxypropyl-acrylate, and 2-hydroxybutyl-acrylate; aminoalkyl (meth)acrylates such as dimethylaminoethyl acrylate, dimethylaminoethyl methacrylate, diethylaminoethyl acrylate, diethylaminoethyl methacrylate and 7-amino-3, 7-dimethyloctyl acrylate, and their salts including their alkyl and benzyl quaternized salts; (meth)acrylic acid and their salts; acrylamide, methacrylamide, and N,N-dialkyl acrylamides such as N,N-dimethyl acrylamide, N,N-diethyl acrylamide, and N,N'-dimethylaminopropyl acrylamide and their salts. Though optional, the content of the monomer (III) can be between 0 to 60% (by weight), preferably between 0 to 20% of the weight of the total monomers.

The polymerization mixture further optionally contains monomer (IV), in an amount between 0 to 10% by weight, which is a crosslinking agent(s). Preferred examples of suitable crosslinking agents include methylene bisacrylamide, pentaerythritol, di-, tri- and tetra-acrylate, divenylbenzene, polyethylene glycol diacrylate and bisphenol A diacrylate.

More generally, suitable crosslinking agents can be polyfunctional ethylenically unsaturated monomers which include, without limitation, alkoxylated bisphenol A diacrylates such as ethoxylated bisphenol A diacrylate with ethoxylation being 2 or greater, preferably ranging from 2 to about 30 (e.g. SR349 and SR601 available from Sartomer Company, inc. West Chester, Pa. and Photomer 4025 and Photomer 4028, available from Henkel Corp. (Ambler, Pa.)), and propoxylated bisphenol A diacrylate with propoxylatlon being 2 or greater, preferably ranging from 2 to about 30;

trimethylolpropane polyacrylates with and without alkoxylation such as ethoxylated trimethylolpropane triacrylate with ethoxylation being 3 or greater, preferably ranging from 3 to about 30 (e.g., Photomer 4149, Henkel Corp., and SR499, Sartomer Company, Inc.), propoxylated trimethylolpropane triacrylate with propoxylation being 3 or greater, preferably ranging from 3 to 30 (e.g., Photomer 4072, Henkel Corp. and SR492, Sartomer), and ditrimethylolpropane tetraacrylate (e.g., Photomer 4355, Henkel Corp.);

alkoxylated glyceryl triacrylates such as propoxylated glyceryl triacrylate with propoxylation being 3 or greater (e.g., Photomer 4096, Henkel Corp. and SR9020, Sartomer);

pentaerythritol polyacrylates with and without alkoxylation, such as pentaerythritol tetraacrylate (e.g., SR295, available from Sartomer Company, Inc. (West Chester, Pa.)), ethoxylated pentaerythritol tetraacrylate (e.g., SR494, Sartomer Company, Inc.), and dipentaerythritol pentaacrylate (e.g., Photomer 4399, Henkel Corp., and SR399, Sartomer Company, Inc.);

isocyanurate polyacrylates formed by reacting an appropriate functional isocyanurate with an acrylic acid or acryloyl chloride, such as tris-(2-hydroxyethyl) isocyanurate triacrylate (e.g., SR368, Sartomer Company, Inc.) and tris-(2-hydroxyethyl) isocyanurate diacrylate; polyol polyacrylates with and without alkoxylation such as tricyclodecane dimethanol diacrylate (e.g., CD406, Sartomer Company, Inc.) and ethoxylated polyethylene glycol diacrylate with ethoxylation being 2 or greater, preferably ranging from about 2 to 30; hydroxy acrylates formed by adding acrylate to bisphenol A diglycidyl ether (4 up) and the like (e.g., Photomer 3016, Henkel Corp.); and single and multi-ring cyclic aromatic or non-aromatic polyacrylates such as dicyclopentadiene diacrylate and dicdopentane diacrylate.

The preparation of the inventive polymers can be carried out using various polymerization techniques such as solution, emulsion, microemulsion, inverse emulsion, and/or bulk polymerizations, as well as other technologies that are available to those who are skilled in the art. The polymerization can obviously be carried out with or without various initiators of various concentrations. The co- or ter-polymers can also be prepared in such a way that the architecture of the polymers is random, block, alternating or core-shell with or without the use of polymerization regulators such as nitroxyl ether or other types of nitroxyl radicals.

The preferred method for making the inventive polymers is by aqueous polymerization using a water-soluble initiator. Examples of the suitable initiators include persulfates such as ammonium persulfate (APS); peroxides such as hydrogen peroxide, t-butyl hydroperoxide, and t-butyl peroxy pivalate, azo initiators such as 2,2'-azobis(2-amidinopropane) dihydrochloride, 4,4'-azobis-4-cyanovaleric acid and 2,2-azobisisobutyronitrile; and redox initiator systems such as t-butyl hydroperoxide/Fe(II) and ammonium persulfate/bisulfite. Aqueous solution polymerization using ammonium persulfate (APS) is the preferred method for preparing the polymer having the preferred cationic DADMAC monomers. The amount of the free radical initiator used in the polymerization process depends on total monomer concentration and the type of monomers used and may range from about 0.2 to about 5.0% by weight of total monomer charge to achieve more than 99% of total monomer conversion.

Hydrophobic monomer (II) dissolves, at least in part, in the aqueous phase and copolymerizes with the preferred cationic monomer DADMAC to form a polymer having both cationic and hydrophobic groups. When hydrophobic monomer (II) is added to the polymerization system in an amount higher than its water solubility, the excess amount can form a second phase in fine droplets if adequate agitation is provided. Without intending to being bound to this polymerization mechanism, the droplets of monomer (II) may serve as a monomer reservoir to provide monomer (II) to the aqueous phase.

When a water-soluble initiator is used, copolymerization of monomer (I) and the dissolved portion of the hydrophobic monomer (II) is initiated in the aqueous phase. The hydrophobically modified polymer thus formed may or may not be soluble in water depending on hydrophobicity or water solubility and the concentration of the monomer (II) used. The resulting polymer can possess surfactant properties and may occur in a colloidal state giving the appearance of translucence.

The required amount of monomer (II) may be added all at the beginning, in increments, or added by continuous feeding to the reactor. Continuous feeding of hydrophobic monomer (II) to the aqueous reaction medium may have the advantage of producing hydrophobically modified copolymers with less formation of homopolymers or large homopolymeric segments.

It is preferred to carry out the polymerization in the absence of oxygen. Oxygen can be removed from the reaction medium by applying vacuum with agitation or by purging with an inert gas such as nitrogen or argon. The polymerization can then be conducted under a blanket of the inert gas.

The molecular weight of the polymers being prepared can range from a thousand to millions. For example they have an average molecular weight in the range of 1000 to 5 million Daltons. The polymers can appear in various forms, I.e. solution, dispersion, suspension, granules, powders, beads, blocks, etc. In the case of liquid forms such as solution, dispersion, suspension etc., the liquid phase can be aqueous and/or non-aqueous such as soy bean oils, esters, and mineral oils.

Cleaning products comprise the polymeric compound of the invention and an effective amount of one or more surfactants. Such cleaning products may be in the form of a laundry detergent, fabric conditioner, pre-treatment agent, after treatment agent or tumble dry sheet having improved dye fixation and dye transfer inhibition. They may also be in the form of a dishwashing formulation. The inventive cleaning products comprise 0.001% to 50%, preferably 0.1 to 5% by weight of a polymeric compound of the invention.

Laundry compositions for use herein may comprise one or more surfactants suitable for use in laundry wash and/or rinsing products. In the most general sense, these may be chosen from one or more of soap and non-soap anionic, cationic, nonionic, amphoteric and zwitterionic surface-active compounds and mixtures thereof. Many suitable surface-active compounds are available and are fully described in the literature, for example, in "Surface-Active Agents and Detergents", Volumes I and II, by Schwartz, Perry and Berch.

For those compositions intended as laundry wash products, preferably, the surfactant(s) is/are selected from one or more soaps and synthetic non-soap anionic and non-ionic compounds. Detergent compositions suitable for use in most automatic fabric washing machines generally contain anionic non-soap surfactant, or non-ionic surfactant, or combinations of the two in any suitable ratio, optionally together with soap.

For example, laundry wash compositions of the invention may contain linear alkylbenzene sulfonate anionic surfactants, particularly linear alkylbenzene sulfonates having an alkyl chain length of $C_8$-$C_{15}$. It is preferred if the level of linear alkylbenzene sulfonate is from 0% by weight to 30% by weight, more preferably 1% by weight to 25% by weight, most preferably from 2% by weight to 15% by weight.

The laundry wash compositions of the invention may additionally or alternatively contain one or more other anionic surfactants in total amounts corresponding to percentages quoted above for alkyl benzene sulfonates. Suitable anionic surfactants are well known to those skilled in the art. These include primary and secondary alkyl sulfates, particularly $C_8$-$C_{15}$ primary alkyl sulfates; alkyl ether sulfates; olefin sulfonates; alkyl xylene sulfonates; dialkyl sulfosuccinates; and fatty acid ester sulfonates. Sodium salts are generally preferred.

Some particular examples of such other anionic surfactants are:
alkyl ester sulfonates of the formula $R_{100}$—CH($SO_3M$)— $COOR_{200}$, where $R_{100}$ is a $C_8$-$C_{20}$, preferably $C_{10}$-$C_{16}$ alkyl radical, $R_{200}$ is a $C_1$-$C_{16}$, preferably $C_1$-$C_3$ alkyl radical, and M is an alkaline cation (sodium, potassium, lithium), unsubstituted or substituted ammonium (e.g. methyl, dimethyl, trimethyl, tetramethyl ammonium, dimethyl piperidinium, etc.) or a derivative of an alkanol amine (monoethanol amine, diethanol amine, triethanol amine, etc.);
alkyl sulfates of the formula $R_{300}OSO_3M$, where $R_{300}$ is a $C_5$-$C_{24}$, preferably $C_{10}$-$C_{18}$ alkyl or hydroxyalkyl radical, and M is a hydrogen atom or a cation as defined above, and their ethyleneoxy (EO) and/or propyleneoxy (PO) derivatives, having on average 0.5 to 30, preferably 0.5 to 10 EO and/or PO units;
alkyl amide sulfates of the formula $R_{400}CONHR_{500}OSO_3M$, where $R_{400}$ is a $C_2$-$C_{22}$, preferably $C_6$-$C_{20}$ alkyl radical, $R_{500}$ is a $C_2$-$C_3$ alkyl radical, and M is a hydrogen atom or a cation as defined above, and their ethyleneoxy (EO) and/or propyleneoxy (PO) derivatives, having on average 0.5 to 60 EO and/or PO units;

salts of $C_8$-$C_{24}$, preferably $C_{14}$-$C_{20}$ saturated or unsaturated fatty acids, $C_8$-$C_{22}$ primary or secondary alkyl sulfonates, alkyl glycerol sulfonates, the sulfonated polycarboxylic acids described in published British Patent 1,082,179, paraffin sulfonates, N-acyl, N'-alkyl taurates, alkyl phosphates, isethionates, alkyl succinamates, alkyl sulfosuccinates, monoesters or diesters of sulfosuccinates, N-acyl sarcosinates, alkyl glycoside sulfates, polyethoxycarboxylates, the cation being an alkali metal (sodium, potassium, lithium), a substituted or non-substituted ammonium residue (methyl, dimethyl, trimethyl, tetramethyl ammonium, dimethyl piperidinium, etc.) or a derivative of an alkanol amine (monoethanol amine, diethanol amine, triethanol amine, etc.); or
sophorolipids, such as those in acid or lactone form, derived from 17-hydroxyoctadecenic acid.

The laundry wash compositions of the invention may contain a nonionic surfactant Nonionic suriactants that may be used include the primary and secondary alcohol ethoxylates, especially the $C_8$-$C_{20}$ aliphatic alcohols ethoxylated with an average of from 1 to 20 moles of ethylene oxide per mole of alcohol, and more especially the $C_{10}$-$C_{15}$ primary and secondary aliphatic alcohols ethoxylated with an average of from 1 to 10 moles of ethylene oxide per mole of alcohol. Non-ethoxylated nonionic surfactants include alkylpolyglycosides, glycerol monoethers, and polyhydroxyamides (glucamide).

Some particular examples of such nonionic surfactants are:
polyalkoxyienated alkyl phenols (i.e. polyethyleneoxy, polypropyleneoxy, polybutyleneoxy), the alkyl substituent of which has from 6 to 12 C atoms and contains from 5 to 25 alkoxylenated units; examples are TRITON X-45, X-114, X-100 and X-102 marketed by Rohm & Haas Co., and IGEPAL NP2 to NP17 made by Rhodia;
$C_8$-$C_{22}$ polyalkoxylenated aliphatic alcohols containing 1 to 25 alkoxylenated (ethyleneoxy, propyleneoxy) units; examples are TERGITOL 15-S-9 and TERGITOL 24-L-6 NMW marketed by Union Carbide Corp., NEODOL 45-9, NEODOL 23-65, NEODOL 45-7 and NEODOL 45-4 marketed by Shell Chemical Co., KYRO EOB marketed by The Procter & Gamble Co., SYNPERONIC A3 to A9 made by ICI and RHODASURF IT, DB and B made by Rhodia;
the products resulting from the condensation of ethylene oxide or propylene oxide with propylene glycol, ethylene glycol, with a molecular weight in the order of 2000 to 10,000, such as the PLURONIC products marketed by BASF;
the products resulting from the condensation of ethylene oxide or propylene oxide with ethylene diamine, such as the TETRONIC products marketed by BASF;
$C_8$-$C_{18}$ ethoxyl and/or propoxyl fatty acids containing 5 to 25 ethyleneoxy and/or propyleneoxy units;
$C_8$-$C_{20}$ fatty acid amides containing 5 to 30 ethyleneoxy units;
ethoxylated amines containing 5 to 30 ethyleneoxy units;
alkoxylated amidoamines containing 1 to 50, preferably 1 to 25 and in particular 2 to 20 alkyleneoxy (preferably ethyleneoxy) units;
amine oxides such as the oxides of alkyl $C_{10}$-$C_{18}$ dimethylamines, the oxides of alkoxy $C_8$-$C_{22}$ ethyl dihydroxyethylamines;
alkoxylated terpene hydrocarbons such as ethoxylated and/or propoxylated- or -pinenes, containing 1 to 30 ethyleneoxy and/or propyleneoxy units;
alkylpolyglycosides obtainable by condensation (for example by acid catalysis) of glucose with primary fatty alcohols (e.g. U.S. Pat. No. 3,598,865; U.S. Pat. No. 4,565, 647; EP-A-132 043; EP-A-132 046) having a $C_4$-$C_{20}$, preferably $C_8$-$C_{18}$ alkyl group and an average number of glucose units in the order of 0.5 to 3, preferably in the order of 1.1 to 1.8 per mole of alkylpolyglycoside (APG), particularly those having a $C_8$-$C_{14}$ alkyl group and on average 1.4 glucose units per mole a $C_{12}$-$C_{14}$ alkyl group and on average 1.4 glucose units per mole a $C_8$-$C_{14}$ alkyl group and on average 1.5 glucose units per mole a $C_8$-$C_{10}$ alkyl group and on average 1.6 glucose units per mole marketed under the names GLUCOPON 600 EC, GLUCOPON 600 CSUP, GLUCOPON 650 EC and GLUCOPON 225 CSUP respectively and made by HENKEL.

The level of total nonionic surfactant is from 0% by weight to 30% by weight, preferably from 1% by weight to 25% by weight, more preferably from 2% by weight to 15% by weight.

Another class of suitable surfactants comprises certain mono-long chain-alkyl cationic surfactants for use in mainwash laundry compositions according to the invention. Cationic suriactants of this type include quaternary ammonium salts of the general formula $R_{10}R_{20}R_{30}R_{40}N^+ X^-$ wherein the R groups are long or short hydrocarbon chains, typically alkyl, hydroxyalkyl or ethoxylated alkyl groups, and X is a counter-ion (for example, compounds in which $R_{10}$ is a $C_8$-$C_{22}$ alkyl group, preferably a $C_8$-$C_{10}$ or $C_{12}$-$C_{14}$ alkyl group, $R_{20}$ is a methyl group, and $R_{30}$ and $R_{40}$, which may be the same or different, are methyl or hydroxyethyl groups); and cationic esters (for example, choline esters).

The choice of surface-active compound (surfactant), and the amount present in the laundry wash compositions according to the invention, will depend on the intended use of the detergent composition. In fabric washing compositions, different surfactant systems may be chosen, as is well known to the skilled formulator, for hand washing products and for products intended for use in different types of washing machines. The total amount of surfactant present will also depend on the intended end use and may be as high as 60% by weight, for example, in a composition for washing fabrics by hand. In compositions for machine-washing of fabrics, an amount of from 5 to 40% by weight is generally appropriate. Typically the compositions will comprise at least 2% by weight surfactant e.g. 2-60%, preferably 15-40% and most preferably 25-35%.

In the case of laundry rinse compositions according to the invention the surfactant(s) is/are preferably selected from fabric conditioning agents. In fact, conventional fabric conditioning agents may be used. These conditioning agents may be cationic or non-ionic. If the fabric conditioning compound is to be employed in a main wash detergent composition the compound will typically be non-ionic. If used in the rinse phase, they will typically be cationic. They may for example be used in amounts from 0.5% to 35%, preferably from 1% to 30% more preferably from 3% to 25% by weight of the composition.

Preferably the fabric conditioning agent(s) have two long chain alkyl or alkenyl chains each having an average chain length greater than or equal to $C_{16}$. Most preferably at least 50% of the long chain alkyl or alkenyl groups have a chain length of $C_8$ or above. It is preferred that the long chain alkyl or alkenyl groups of the fabric conditioning agents are predominantly linear.

The fabric conditioning agents are preferably compounds that provide excellent softening, and are characterized by a chain melting L to L transition temperature greater than 25° C., preferably greater than 35° C., most preferably greater than 45° C.

Substantially insoluble fabric conditioning compounds in the context of this invention are defined as fabric conditioning compounds having a solubility less than $1 \times 10^{-3}$% by weight in demineralized water at 20° C. Preferably the fabric softening compounds have a solubility less than $1 \times 10^{-4}$ wt %, most preferably less than $1 \times 10^{-8}$ to $1 \times 10^{-8}$. Preferred cationic fabric softening agents comprise a substantially water-insoluble quaternary ammonium material comprising a single alkyl or alkenyl long chain having an average chain length greater than or equal to $C_{20}$ or, more preferably, a compound comprising a polar head group and two alkyl or alkenyl chains having an average chain length greater than or equal to $C_{14}$.

Preferably, the catatonic fabric softening agent is a quaternary ammonium material or a quaternary ammonium material containing at least one ester group. The quaternary ammonium compounds containing at least one ester group are referred to herein as ester-linked quaternary ammonium compounds.

As used in the context of the quaternary ammonium cationic fabric softening agents, the term ester group, includes an ester group which is a linking group in the molecule.

It is preferred for the ester-linked quaternary ammonium compounds to contain two or more ester groups. In both monoester and the diester quaternary ammonium compounds it is preferred if the ester group(s) is a linking group between the nitrogen atom and an alkyl group. The ester groups(s) are preferably attached to the nitrogen atom via another hydrocarbyl group.

Also preferred are quaternary ammonium compounds containing at least one ester group, preferably two, wherein at least one higher molecular weight group containing at least one ester group and two or three lower molecular weight groups are linked to a common nitrogen atom to produce a cation and wherein the electrically balancing anion is a halide, acetate or lower alkosulfate ion, such as chloride or methosulfate. The higher molecular weight substituent on the nitrogen is preferably a higher alkyl group, containing 12 to 28, preferably 12 to 22, e.g. 12 to 20 carbon atoms, such as coco-allkyl, tallowalkyl, hydrogenated tallowalkyl or substituted higher alkyl, and the lower molecular weight substituents are preferably lower alkyl of 1 to 4 carbon atoms, such as methyl or ethyl, or substituted lower alkyl. One or more of the said lower molecular weight substituents may include an aryl moiety or may be replaced by an aryl, such as benzyl, phenyl or other suitable substituents.

Preferably the quaternary ammonium material is a compound having two $C_{12}$-$C_{22}$ alkyl or alkenyl groups connected to a quaternary ammonium head group via at least one ester link, preferably two ester links or a compound comprising a single long chain with an average chain length equal to or greater than $C_{20}$.

More preferably, the quaternary ammonium material comprises a compound having two long chain alkyl or alkenyl chains with an average chain length equal to or greater than $C_{14}$. Even more preferably each chain has an average chain length equal to or greater than $C_{16}$. Most preferably at least 50% of each long chain alkyl or alkenyl group has a chain length of $C_{18}$. It is preferred If the long chain alkyl or alkenyl groups are predominantly linear.

The most preferred type of ester-linked quaternary ammonium material that can be used in laundry rinse compositions according to the invention is represented by the formula (A):

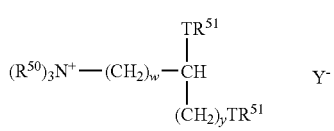

(A)

wherein T is

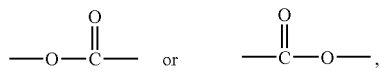

each $R^{50}$ group is independently selected from $C_{1-4}$ alkyl, hydroxyalkyl or $C_{2-4}$ alkenyl groups; and wherein each $R^{51}$ group is independently selected from $C_{8-28}$ alkyl or alkenyl groups; $Y^-$ is any suitable counter-ion, i.e. a halide, acetate or lower alkosulfate ion, such as chloride or methosulfate;

w is an integer from 1-5 or is 0; and y is an integer from 1-5.

It is especially preferred that each $R^{50}$ group is methyl and w is 1 or 2.

It is advantageous for environmental reasons if the quaternary ammonium material is biologically degradable. Preferred materials of this class such as 1,2 bis[hardened tallowoyloxy]-3-trimethylammonium propane chloride and their method of preparation are, for example, described in U.S. Pat. No. 4,137,180. Preferably these materials comprise small amounts of the corresponding monoester as described in U.S. Pat. No. 4,137,180 for example 1-hardened tallowoyloxy-2-hydroxy-3-trimethylammonium propane chloride.

Another class of preferred ester-linked quaternary ammonium materials for use in laundry rinse compositions according to the invention can be represented by the formula (B):

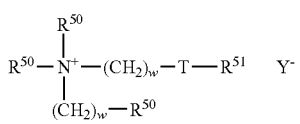

(B)

wherein T is

$R^{50}$, $R^{51}$, and $Y^-$ are as defined above.

Of the compounds of formula (B), di-(tallowyloxyethyl)-dimethyl ammonium chloride, available from Hoechst, is the most preferred. Di-(hardened tallowyloxyethyl)dimethyl ammonium chloride, ex Hoechst and di-(tallowyloxyethyl)-methyl hydroxyethyl methosulfate are also preferred.

Another preferred class of quaternary ammonium cationic fabric softening agent is defined by formula (C):

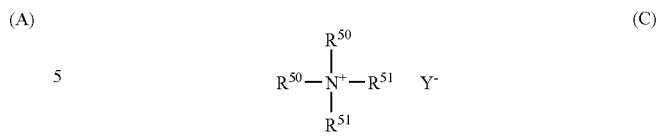

(C)

where $R^{50}$, $R^{51}$ and $Y^-$ are as hereinbefore defined.

A preferred material of formula (C) is di-hardened tallow-diethyl ammonium chloride, sold under the Trademark ARQUAD 2HT.

The optionally ester-linked quaternary ammonium material may contain optional additional components, as known in the art, in particular, low molecular weight solvents, for instance isopropanol and/or ethanol, and co-actives such as nonionic softeners, for example fatty acid or sorbitan esters.

Detergency Builders

The compositions of the invention, when used as laundry wash compositions, will generally also contain one or more detergency builders. The total amount of detergency builder in the compositions will typically range from 5 to 80% by weight, preferably from 10 to 60% by weight.

Inorganic builders that may be present include sodium carbonate, if desired in combination with a crystallization seed for calcium carbonate, as disclosed in GB 1 437 950 (Unilever); crystalline and amorphous aluminosilicates, for example, zeolites as disposed in GB 1 473 201 (Henkel), amorphous aluminosilicates as disclosed in GB 1 473 202 (Henkel) and mixed crystalline/amorphous aluminosilicates as disclosed in GB 1 470 250 (Procter & Gamble); and layered silicates as disclosed in EP 164 514B (Hoechst). Inorganic phosphate builders, for example, sodium orthophosphate, pyrophosphate and tripolyphosphate are also suitable for use with this invention.

The compositions of the invention preferably contain an alkali metal, preferably sodium, aluminosilicate builder. Sodium aluminosillcates may generally be incorporated in amounts of from 10 to 70% by weight (anhydrous basis), preferably from 25 to 50% by weight.

The alkali metal aluminosilicate may be either crystalline or amorphous or mixtures thereof, having the general formula: $0.8\text{-}1.5\, Na_2O \cdot Al_2O_3 \cdot 0.8\text{-}6\, SiO_2$.

These materials contain some bound water and are required to have a calcium ion exchange capacity of at least 50 mg CaO/g. The preferred sodium aluminosilicates contain $1.5\text{-}3.5\, SiO_2$ units (in the formula above). Both the amorphous and the crystalline materials can be prepared readily by reaction between sodium silicate and sodium aluminate, as amply described in the literature. Suitable crystalline sodium aluminosilicate ion-exchange detergency builders are described, for example, in GB 1 429 143 (Procter & Gamble). The preferred sodium aluminosilicates of this type are the well-known commercially available zeolites A and X, and mixtures thereof.

The zeolite may be the commercially available zeolite 4A now widely used in laundry detergent powders. However, according to a preferred embodiment of the invention, the zeolite builder incorporated in the compositions of the invention is maximum aluminum zeolite P (zeolite MAP) as described and claimed in EP 384 070A (Unilever). Zeolite MAP is defined as an alkali metal aluminosilicate of the zeolite P type having a silicon to aluminum ratio not exceeding 1.33, preferably within the range of from 0.90 to 1.33, and more preferably within the range of from 0.90 to 1.20.

Especially preferred is zeolite MAP having a silicon to aluminum ratio not exceeding 1.07, more preferably about 1.00. The calcium binding capacity of zeolite MAP is generally at least 150 mg CaO per g of anhydrous material.

Organic builders that may be present include polycarboxylate polymers such as polyacrylates, acrylic/maleic copolymers, and acrylic phosphinates; monomeric polycarboxylates such as citrates, gluconates, oxydisuccinates, glycerol mono-, di and trisuccinates, carboxymethyloxy succinates, carboxymethyloxymalonates, dipicolinates, hydroxyethyliminodiacetates, alkyl- and alkenylmalonates and succinates; and sulfonated fatty add salts. This list is not intended to be exhaustive. Especially preferred organic builders are citrates, suitably used in amounts of from 5 to 30% by weight, preferably from 10 to 25% by weight; and acrylic polymers, more especially acrylic/maleic copolymers, suitably used in amounts of from 0.5 to 15% by weight, preferably from 1 to 10% by weight.

Builders, both inorganic and organic, are preferably present in alkali metal salt, especially sodium salt, form.

Laundry wash compositions according to the invention may also suitably contain a bleach system. Fabric washing compositions may desirably contain peroxy bleach compounds, for example, inorganic persalts or organic peroxyacids, capable of yielding hydrogen peroxide in aqueous solution.

Suitable peroxy bleach compounds include organic peroxides such as urea peroxide, and inorganic persalts such as the alkali metal perborates, percarbonates, perphosphates, persilicates and persulfates. Preferred inorganic persalts are sodium perborate monohydrate and tetrahydrate, and sodium percarbonate.

Especially preferred is sodium percarbonate having a protective coating against destabilization by moisture. Sodium percarbonate having a protective coating comprising sodium metaborate and sodium silicate is disclosed in GB 2 123 044B (Kao).

The peroxy bleach compound is suitably present in an amount of from 0.1 to 35% by weight, preferably from 0.5 to 25% by weight. The peroxy bleach compound may be used in conjunction with a bleach activator (bleach precursor) to improve bleaching action at low wash temperatures. The bleach precursor is suitably present in an amount of from 0.1 to 8% by weight, preferably from 0.5 to 5% by weight.

Preferred bleach precursors are peroxycarboxylic acid precursors, more especially peracetic acid precursors and pemonanoic acid precursors. Especially preferred bleach precursors suitable for use in the present invention are N,N,N',N',-tetracetyl ethylenediamine (TAED) and sodium nonanoyloxybenzene sulfonate (SNOBS). The novel quaternary ammonium and phosphonium bleach precursors disclosed in U.S. Pat. No. 4,751,051 and U.S. Pat No. 4,818,426 (Lever Brothers Company) and EP 402 971A (Unilever), and the cationic bleach precursors disposed in EP 284 292A and EP 303 520A (Kao) are also of interest.

The bleach system can be either supplemented with or replaced by a peroxyacid. Examples of such peracids can be found in U.S. Pat. No. 4,686,063 and U.S. Pat. No. 5,397,501 (Unilever). A preferred example is the imido peroxycarboxylic class of peracids described in EP A 325 288, EP A 349 940, DE 382 3172 and EP 325 289. A particularly preferred example is phthalimido peroxycaproic acid (PAP). Such peracids are suitably present at 0.1-12%, preferably 0.5-10%.

A bleach stabilizer (transition metal sequesterant) may also be present. Suitable bleach stabilizers include ethylenediamine tetra-acetate (EDTA), the polyphosphonates such as DEQUEST™ and non-phosphate stabilizers such as EDDS (ethylenediamine di-succinic add). These bleach stabilizers are also useful for stain removal especially in products containing low levels of bleaching species or no bleaching species.

An especially preferred bleach system comprises a peroxy bleach compound (preferably sodium percarbonate optionally together with a bleach activator), and a transition metal bleach catalyst as described in EP 458 397A, EP 458 398A and EP 509 787A (Unilever).

Laundry wash compositions according to the invention may also contain one or more enzyme(s). Suitable enzymes include the proteases, amylases, cellulases, oxidases, peroxidases and lipases usable for incorporation in detergent compositions. Preferred proteolytic enzymes (proteases) are catalytically active protein materials which degrade or alter protein types of stains in a hydrolyses reaction when present as in fabric stains. They may be of any suitable origin, such as vegetable, animal, bacterial or yeast origin.

Proteolytic enzymes or proteases of various qualities and origins and having activity in various pH ranges of from 4-12 are available and can be used in the instant invention. Examples of suitable proteolytic enzymes are the subtilisins which are obtained from particular strains of *B. Subtilwas B. licheniformis*, such as the commercially available subtilisins MAXATASE™, as supplied by Gist Brocades N. V., Delft, Holland, and ALCALASE™, as supplied by Novo Industri A/S, Copenhagen, Denmark.

Particularly suitable is a protease obtained from a strain of *Bacillus* having maximum activity throughout the pH range of 8-12, being commercially available, e.g. from Novo industri A/S under the registered trade-names ESPERASE™ and SAVINASE™. The preparation of these and analogous enzymes is described in GB 1 243 785. Other commercial proteases are KAZUSASE™, obtainable from Showa-Denko of Japan), OPTIMASE™, from Miles Kali-Chemie, Hannover, West Germany), and SUPERASE™, obtainable from Pfizer of U.S.A).

Detergency enzymes are commonly employed in granular form in amounts of from about 0.1 to about 3.0% by weight However, any suitable physical form of enzyme may be used.

The compositions of the invention may contain other optional ingredients such as alkali metal, preferably sodium carbonate, in order to increase detergency and ease processing. Sodium carbonate may suitably be present in amounts ranging from 1 to 60% by weight, preferably from 2 to 40% by weight However, compositions containing little or no sodium carbonate are also within the scope of the invention.

Powder flow may be improved by the incorporation of a small amount of a powder structurant, for example, a fatty add (or fatty acid soap), a sugar, an acrylate or acrylate/maleate copolymer, or sodium silicate. One preferred powder structurant is fatty add soap, suitably present in an amount of from 1 to 5% by weight.

Yet other materials that may be present in detergent compositions of the invention include sodium silicate; anti-redeposition agents such as cellulosic polymers; inorganic salts such as sodium sulfate; lather control agents or lather boosters as appropriate; proteolytic and lipolyfic enzymes; dyes; colored speckles; perfumes; foam controllers; fluorescent whiteners and decoupling polymers. This list is not intended to be exhaustive.

Still other materials that may be present in detergent compositions of the invention include other additives such as softeners, perfumes, soil release polymers, colorants, preservatives, antimicrobials with various activities against various microorganisms, insect repellents, dust mites repellents and/or otherwise controlling agents, optical brighteners, UV absorbers, other light management agents, ionization agents, antifoam agents, enzymes of various kinds, bleaching agents, oxidation catalysts, zeolites and odor suppressing agents including but not limited to cydodextrin and its various derivatives.

The inventive composition, when diluted in the wash liquor (during a typical wash cycle), will typically give a pH of the wash liquor from 7 to 11, preferably from 7 to 10.5, for a wash product. Treatment of a fabric with a polymer having both cationic and hydrophobic groups in accordance with an aspect of the present invention can be made by any suitable method such as washing, soaking or rinsing.

Typically the treatment will involve a washing or rinsing method such as treatment in the main wash or rinse cycle of a washing machine and involves contacting the fabric with an aqueous medium comprising the composition according to the first aspect of the present invention.

Compositions according to another aspect of the present invention may be formulated in any convenient form, for example as powders, liquids (aqueous or non-aqueous) or tablets.

Particulate detergent compositions are suitably prepared by spray-drying a slurry of compatible heat-insensitive ingredients, and then spraying on or post-dosing those ingredients unsuitable for processing via the slurry. The skilled detergent formulator will have no difficulty in deciding which ingredients should be included in the slurry and which should not.

Particulate detergent compositions of the invention preferably have a bulk density of at least 400 g/l, more preferably at least 500 g/l. Especially preferred compositions have bulk densities of at least 650 g/liter, more preferably at least 700 g/liter.

Such powders may be prepared either by post-tower densification of spray-dried powder, or by wholly non-tower methods such as dry mixing and granulation; in both cases a high-speed mixer/granulator may advantageously be used. Processes using high-speed mixer/granulators are disclosed, for example, in EP 340 013A, EP 367 339A, EP 390 251A and EP 420 317A (Unilever).

Liquid detergent compositions can be prepared by admixing the essential and optional ingredients thereof in any desired order to provide compositions containing components in the requisite concentrations. Liquid compositions according to the present invention can also be in compact form, which means it will contain a lower, level of water compared to a conventional liquid detergent.

The following examples describe certain embodiments of this invention, but the invention is not limited thereto. It should be understood that numerous changes to the disclosed embodiments can be made in accordance with the disclosure herein without departing from the spirit or scope of the invention. These examples are therefore not meant to limit the scope of the invention. Rather, the scope of the invention is to be determined only by the appended claims and their equivalents. In these examples all parts given are by weight unless otherwise indicated.

EXAMPLE 1

A 1-liter reactor equipped with a condenser, a thermometer, a nitrogen inlet, and an overhead agitator is charged with 453.8 g of 66% monomer DADMAC in water, 15.8 g of methyl methacrylate (MMA), 57.4.0 g of deionized water and 0.15 g of 20% $Na_4EDTA$ solution. The polymerization mixture is purged with nitrogen and heated with agitation to a temperature of 90° C. An aqueous solution containing 5.1 g of ammonium persulfate (APS) is slowly fed to the reactor over 190 minutes. The reaction temperature is allowed to increase to above 100° C. and then maintained at reflux temperature (100 to 110° C.) during the APS feed period. After the APS feed, the reaction temperature is lowered down to and held at 95° C. for about 30 minutes. Then an aqueous solution containing 5.6 g of sodium metabisulfite (MBS) is added over 30 minutes. The reactor content is held at 95° C. for another 30 minutes to complete the polymerization (above 99% conversion). The polymer solution is diluted with sufficient water to about 35% solids and cooled to room temperature. Total monomer conversion is measured to be above 99.5%. The final product has a Brookfield viscosity of 23,400 cps at 25° C. and 33.7% polymer solids.

EXAMPLE 2

A 1-liter reactor equipped with a condenser, a thermometer, a nitrogen inlet, and an overhead agitator is charged with 453.8 g of 66% monomer DADMAC in water, 15.8 g of ethoxylated nonylphenol acrylate (ENPA)), 57.4.0 g of deionized water and 0.15 g of 20% $Na_4EDTA$ solution. The polymerization mixture is purged with nitrogen and heated with agitation to a temperature of 90° C. An aqueous solution containing 5.1 g of ammonium persulfate (APS) is slowly fed to the reactor over 190 minutes. The reaction temperature is allowed to increase to above 100° C. and then maintained at reflux temperature (100 to 110° C.) during the APS feed period. After the APS feed, the reaction temperature is lowered down to and held at 95° C. for about 30 minutes. Then an aqueous solution containing 5.6 g of sodium metabisulfite (MBS) is added over 30 minutes. The reactor content is held at 95° C. for another 30 minutes to complete the polymerization (above 99% conversion). The polymer solution is diluted with sufficient water to about 35% solids and cooled to room temperature. Total monomer conversion is measured to be above 99.5%. The final product has a Brookfield viscosity of 15,700 cps at 25° C. and 33.7% polymer solids.

EXAMPLE 3

This example demonstrates addition of hydrophobic monomer II by feeding. The polymerization procedure is the same as example 1 except that the amount of 15.8 9 methyl methacrylate is fed to the reactor over about 45 minutes when the APS initiator feed is started. The polymer solution is diluted with sufficient water to about 35% solids and cooled to room temperature. Total monomer conversion is measured to be above 99.5%. The final product has a Brookfield viscosity of 19,500 cps at 25° C. and 35% polymer solids. The final polymer product is dear as compared to the emulsion appearance of the Example 1 product.

EXAMPLE 4

Application: Fix Before Wash I

Fixation:
The product is applied from an aqueous solution to a dyed fabric sheet ("Bleeder") and spin-dried.

Wash:
This treated fabric is washed together with a colorless Fabric ("Acceptor") using a standard detergent without any dye fixing or dye transfer-inhibiting agent. The fabrics are spin-dried, rinsed with dear water, spin-dried and dried at 60° C. In every subsequent wash cycle the "Acceptor" is replaced by a new one.

Performance is assessed by the absorption (extinction at absorption maximum) of the Fix liquor, wash liquor and the dye deposition on the white "Acceptor" fabric (Delta E).

The resulting absorption and Delta E values are used to calculate the corresponding amount of dyestuff. All results are given on the amount of dyestuff lost from one kg of dyed fabric.

Application Conditions:

5 g of a dyed cotton fabric (2.09% Direct Blue 78) are treated 15 minutes with 2.5 g/l or 5 g/l of a solution containing 1% active matter of the polymer at a Liquor Ratio of 1:10 at 40° C. The fabric is removed from the liquor, spin dried and washed for 15 minutes together with 5 g of a colorless cotton fabric "Acceptor" in a 2.5 g/l ECE77 detergent solution a Liquor Ratio of 1:10 at 40° C. The fabrics are squeezed, rinsed under running tap water, spin-dried and dried in an oven at 60° C.

This procedure is repeated 2 times with the same "Bleeder" using a new "Acceptor" in every wash.

Results:

[mg dye lost per kg of dyed fabric]

|  | 2.5 g/l dosage | | | | 5.0 g/l dosage | | | |
| --- | --- | --- | --- | --- | --- | --- | --- | --- |
|  | Lost into Liquor | | onto | | Lost into Liquor | | onto | |
| Product | FIX | WASH | FABRIC | total | FIX | WASH | FABRIC | total |
| None | 1320 | 620 | 1300 | 3240 | 1320 | 620 | 1300 | 3240 |
| Ex. 2 | 223 | 695 | 1549 | 2466 | 7 | 410 | 1004 | 1420 |
| TINOFIX CL | 749 | 503 | 824 | 2075 | 163 | 454 | 607 | 1224 |
| Example 1 | 172 | 644 | 1403 | 2219 | 9 | 309 | 729 | 1046 |

Where Ex. 2 is a copolymer of DADMAC and acrylamide and TINOFIX CL is a commercial product from Ciba Specialty Chemicals.

The results shown above indicate that the amount of dyes lost to the fix liquor, wash liquor and to the acceptor fabrics is much reduced when small amount of hydrophobically modified DADMAC polymer is used to treat the fabrics before washing; hence there is excellent performance in preventing dyes from bleeding.

EXAMPLE 5

Application: Fix During Wash

A colored fabric ("Bleeder") is washed together with a colorless Fabric ("Acceptor") using a standard detergent without any dye fixing or dye transfer-inhibiting agent. The dye-fixing polymer is added to the wash liquor just before the application. The fabrics are spin-dried, rinsed with clear water, spin dried and dried at 60° C. In every following wash cycle the "Acceptor" is substituted by a new one.

Performance is assessed by the absorption (extinction at absorption maximum) of the Wash liquor and the dye deposition on the white "Acceptor" fabric (Delta E).

The resulting absorption and Delta E values are used to calculate the corresponding amount of dyestuff. All results are given on the amount of dyestuff lost from one kg of dyed fabric.

Application Conditions:

5g of a dyed cotton fabric (2.09% Direct Blue 78) and 5 g of a colorless cotton fabric "Acceptor" in a 2.5 g/l standard detergent ECE77 solution. The dye-fixing polymer is added to the detergent solution at 1% on weight of detergent just before application. The Liquor Ratio is 1:10 and the washing temperature is 40° C.

The fabrics are squeezed, rinsed under running tap water, spin-dried and dried in an oven at 60° C.

This procedure is repeated 2 times with the same "Bleeder" using a new "Acceptor" in every wash.

Results:

[mg dye lost per kg of dyed fabric]

|  | Lost Dyestuff | | |
| --- | --- | --- | --- |
| Product | Into Liquor | onto Fabric | Total |
| TINOFIX CL | 878 | 943 | 1821 |
| SOKALAN HP 56 | 2075 | 434 | 2509 |
| PVP K-30 | 1707 | 690 | 2397 |
| none | 745 | 1569 | 2314 |

-continued

|  | Lost Dyestuff | | |
| --- | --- | --- | --- |
| Product | Into Liquor | onto Fabric | Total |
| Example 1 | 565 | 710 | 1275 |
| Example 2 | 496 | 640 | 1136 |

Where SOKALAN HP 56 and PVP K-30 are both commercially available poly(vinylpyrrolidone)-based anti-redeposition agents.

Results as shown above indicate that when hydrophobically modified DADMAC polymers are added in small amounts to a laundry detergent, the amount of the dyes lost to the liquor is very much reduced. In addition, such polymers also help prevent the migrating dyes from redepositing in a way that is similar to the commercially available anti-deposition agents such as SOKALAN HP 56 and PVP K-30.

EXAMPLE 6

Preparation of Hydrophobically Modified Polymers by Co-polymerizing DADMAC with Various Hydrophobic Monomers Hydrophobically modified polymers were prepared by copolymerizing DADMAC with various amounts, i.e. 2.5%, 5% and 10% (w/w), of methyl methacrylate, butyl methacrylate, benzyl methacrylate, using the procedure as described in Example 1.

| Polymer | | Total monomer conversion | Solids | Brookfield viscosity (25° C.) |
|---|---|---|---|---|
| Comparison Ex. | (1) DADMAC (100%) | 99.9% | 35% | 7,850 |
| Example 6A | (2) DADMAC:MMA (97.5:2.5) | >99% | 35% | 23,600 |
| Example 6B | (3) DADMAC:Methyl MA (95:5) | >99% | 32% | 9,000 |
| Example 6C | DADMAC:Butyl MA (95:5) | >99% | 35% | 15,200 |
| Example 6D | DADMAC:Benzyl MA (95:5) | >99% | 35% | 15,400 |

Application tests as described below were carried out to study the influence of the type of the hydrophobic monomers and/or the amount of hydrophobic monomer on the color fixation performance. It is noted that the examples are for Illustration purposes only and the selection and usage of the hydrophobic monomers are by no means restricted by these examples.

EXAMPLE 7

Application: Fix Before Wash Tests with Hydrophobically Modified Polymers Prepared by Polymerizing DADMAC and Various Amount of Methyl Methacrylate Monomer The application conditions for this set of tests were modified slightly in comparison with what was described in Example 4. Thus, 5g Bleeder fabrics made of 100% cotton and dyed with 2.09% Direct Blue and/or 3.0% Direct Red 227 respectively were rinsed in an aqueous solution containing 5 g/l of a 1% solution of the polymer being tested. The rinsing was carried out at 25° C. for 30 minutes, at a 10:1 liquor ratio and water hardness 11° dH. The drying was carried out at room temperature This pre fixed Bleeder is washed together with:

5g Acceptor—bleached 100% cotton fabric
2.5 g/l ECE 77 standard detergent
Liquor ratio 10:1, water hardness 11° dH
30° C., 15 Minutes.

The amount of lost dye is calculated from the absorption of the wash liquor and the Delta E value of the Acceptor.

The following results were obtained with Cotton dyed with D Blue 078 dye (results expressed as mg dyes lost per kg of dyed fabrics)

| Polymer | Monomer composition | Lost dyes To acceptor | Lost dyes To liquor | Total |
|---|---|---|---|---|
| Comparison example | (4) DADMAC | 280 | 161 | 414 |
| Example 6A | DADMAC:MMA (97.5:2.5) | 203 | 119 | 322 |
| Example 6B | DADMAC:MMA (95:5) | 212 | 121 | 333 |
| No polymer | | 472 | 258 | 739 |

Results obtained with Cotton dyed with D Red 227 dye (results expressed as mg dyes lost per kg of dyed fabrics)

| Polymer | Monomer composition | Lost dyes To acceptor | Lost dyes To liquor | Total |
|---|---|---|---|---|
| comparison example | (5) DADMAC | 157 | 165 | 322 |
| Example 6A | DADMAC:MMA (97.5:2.5) | 134 | 135 | 269 |
| Example 6B | DADMAC:MMA (95:5) | 137 | 150 | 287 |
| No polymer | | 254 | 203 | 458 |

The results showed that the hydrophobically modified polymers were able to afford significant improvement in dye fixation performances and the degree of improvement was dependent on the amount of the hydrophobic monomers in the copolymers.

EXAMPLE 8

Application: Fix Before Wash Tests with Hydrophobically Modified Polymers Prepared by Polymerizing 95% of DADMAC and 5% of Various Hydrophobic Monomers With exception of the polymers used in the tests, all other test conditions were the same as described in Example 7.

Results obtained with Cotton dyed with D Blue 078 dyes (results expressed as mg dyes lost per kg of dyed fabrics)

| Polymer | Monomer composition | Lost dyes To acceptor | Lost dyes To liquor | Total |
|---|---|---|---|---|
| Comparison Example | (6) DADMAC (100%) | 280 | 161 | 414 |
| Example 6B | (7) DADMAC:Methyl MA (95:5) | 212 | 121 | 333 |
| Example 6C | DADMAC:Butyl MA (95:5) | 212 | 141 | 353 |
| Example 6D | DADMAC:Benzyl MA (95:5) | 212 | 127 | 339 |
| No polymer | | 472 | 258 | 739 |

Results obtained with Cotton dyed with D Red 227 dye (results expressed as mg dyes lost per kg of dyed fabrics)

| Polymer | Monomer composition | Lost dyes To acceptor | Lost dyes To liquor | Total |
|---|---|---|---|---|
| Comparison Example | (8) DADMAC (100%) | 157 | 165 | 322 |
| Example 6B | DADMAC:Methyl MA (95:5) | 136 | 145 | 281 |
| Example 6C | DADMAC:Butyl MA (95:5) | 130 | 143 | 273 |
| Example 6D | DADMAC:Benzyl MA (95:5) | 120 | 131 | 251 |
| No polymer | | 254 | 203 | 458 |

The results showed that the hydrophobically modified polymers were able to afford significant improvement in dye fixation performances and the degree of improvement was dependent on the type of the hydrophobic monomers used in the copolymers.

We claim:
1. A polymeric compound formed from a mixture of monomeric components consisting of:
(I) 20 to 99.9% by weight of at least one cationic monomer according to formula (1)

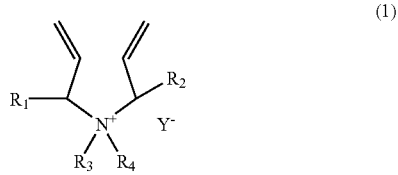

(1)

where
  $R_1$ and $R_2$ are, independently of one another, hydrogen or $C_1$-$C_4$ alkyl;
  $R_3$ and $R_4$ are, independently of one another, hydrogen, or an alkyl, hydroxyalkyl, carboxyalkyl, carboxyamidealkyl or alkoxyalkyl group having from 1 to 18 carbon atoms; and
  $Y^-$ represents an anion;
(II) 0.1 to 80% by weight of at least one hydrophobic unsaturated nonionic monomer that polymerizes in the presence of an initiator selected from the group consisting of styrene, esters of (meth)acrylic acid, (meth)acrylonitrile, esters of unsaturated polyfunctional acids and vinyl esters of $C_2$ to $C_{18}$ carboxylic acids;
(III) 0 to 60% by weight of a water-soluble monomer different from monomer (I) and monomer (II) selected from the group consisting of vinyl amine, vinyl alcohol, vinyl derivatives of dimethyl siloxane, aminosiloxanes, hydroxyalkyl acrylates, (meth)acrylic acid and (meth)acrylic acid salts; and
(IV) 0 to 10% by weight a crosslinking agent.

2. A polymeric compound according to claim 1 wherein at least one cationic monomer (I) is selected from the group consisting of diallyldimethyl ammonium chloride (DADMAC), diallyldimethyl ammonium bromide, diallyldimethyl ammonium sulfates, diallyldimethyl ammonium phosphates, dimethallyl dimethyl ammonium chloride, diethylallyl dimethyl ammonium chloride, diallyl di(beta-hydroxyethyl) ammonium chloride, and diallyl di(beta-ethoxyethyl) ammonium chloride.

3. A polymeric compound according to claim 1 wherein at least one cationic monomer (I) is diallyldimethyl ammonium chloride (DADMAC).

4. A polymeric compound according to claim 1 wherein hydrophobic monomeric reactant (II) has a value for water solubility of less than about 50 g/100 g of water at room temperature and a pH of 7.

5. A polymeric compound according to claim 1 wherein at least one hydrophobic monomer (II) is represented by formula (B)

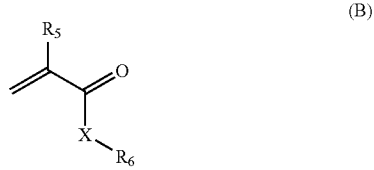

(B)

where $R_5$ is H or $CH_3$, and $R_6$ is $C_1$-$C_{12}$ alkyl, $C_1$-$C_6$ alkylphenyl that may be substituted one to three times by $C_1$-$C_{12}$ alkyl or $C_1$-$C_{12}$ alkoxy, or $C_1$-$C_6$ alkylphenyl interrupted one or more times by oxygen wherein the phenyl group may be substituted one to three times by $C_1$-$C_{12}$ alkyl or $C_1$-$C_{12}$ alkoxy; $C_1$-$C_6$alkylhydroxy and X is a divalent oxygen radical.

6. A polymeric compound according to claim 1 wherein hydrophobic monomer (II) is selected from the group consisting of

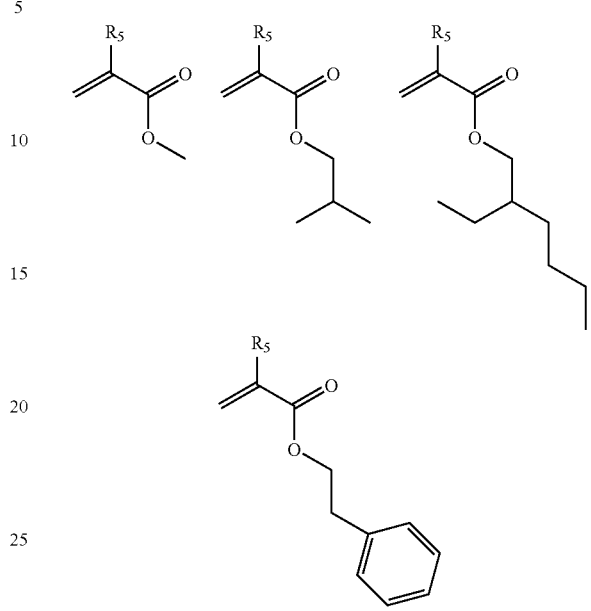

wherein $R_5$ is H or $CH_3$.

7. A polymeric compound according to claim 1 wherein water-soluble monomer (III) has a value for water solubility greater than 50 g/100 g water at room temperature and at a pH of 7.

8. A polymeric compound according to claim 1 having an average molecular weight in the range of 1000 to 5 million Daltons.

9. A cleaning product comprising the polymeric compound according to claim 1 and an effective amount of one or more surfactants.

10. A cleaning product according to claim 9 in the form of a laundry detergent, fabric conditioner, pre-treatment agent, after treatment agent or tumble dry sheet having improved dye fixation and dye transfer inhibition.

11. A cleaning product according to claim 9 in the form of a dishwashing formulation.

12. A cleaning product according to claim 9 comprising 0.001% to 50% by weight of said polymeric compound.

13. A cleaning product according to claim 9 further comprising at least one modifying ingredient selected from the group consisting of softeners, perfumes, soil release polymers, colorants, preservatives, antimicrobials, insect repellents, dust mites repellents, optical brighteners, UV absorbers, other light management agents, ionization agents, antifoam agents, enzymes, bleaching agents, oxidation catalysts, zeolites, and odor suppressing agents.

14. A textile processing formulation comprising 0.001% to 50% by weight of a polymeric compound according to claim 1 in liquid or solid form.

15. Dyeing or printing auxiliaries and/or finishing agents comprising the textile formulation according to claim 14.

16. A method for textile processing comprising addition of the textile formulation according to claim 14 before, during and after dyeing to improve the wet fastness and prevent color fading of the textile.

* * * * *

UNITED STATES PATENT AND TRADEMARK OFFICE
CERTIFICATE OF CORRECTION

PATENT NO.       : 7,659,354 B2
APPLICATION NO.  : 10/540198
DATED            : February 9, 2010
INVENTOR(S)      : Song et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 731 days.

Signed and Sealed this

Thirtieth Day of November, 2010

David J. Kappos
*Director of the United States Patent and Trademark Office*